US012183974B2

(12) United States Patent
Kawai et al.

(10) Patent No.: US 12,183,974 B2
(45) Date of Patent: Dec. 31, 2024

(54) SLOT ANTENNA

(71) Applicant: DENSO TEN Limited, Kobe (JP)

(72) Inventors: Kenji Kawai, Kobe (JP); Kazushige Ogino, Kobe (JP); Tetsuro Okano, Kobe (JP); Kakeru Yamashita, Kobe (JP)

(73) Assignee: DENSO TEN Limited, Kobe (JP)

( * ) Notice: Subject to any disclaimer, the term of this patent is extended or adjusted under 35 U.S.C. 154(b) by 117 days.

(21) Appl. No.: 18/073,157

(22) Filed: Dec. 1, 2022

(65) Prior Publication Data

US 2023/0268659 A1 Aug. 24, 2023

(30) Foreign Application Priority Data

Feb. 24, 2022 (JP) ................................ 2022-026573

(51) Int. Cl.
*H01Q 13/10* (2006.01)
*H01Q 1/32* (2006.01)
*H01Q 1/50* (2006.01)

(52) U.S. Cl.
CPC ......... *H01Q 13/106* (2013.01); *H01Q 1/3275* (2013.01); *H01Q 1/50* (2013.01)

(58) Field of Classification Search
CPC ........ H01Q 13/10; H01Q 1/38; H01Q 13/106; H01Q 21/065; H01Q 21/064; H01Q 21/24; H01Q 9/0407; H01Q 1/52; H01Q 9/0457; H01Q 1/2225; H01Q 1/243; H01Q 13/16
See application file for complete search history.

(56) References Cited

U.S. PATENT DOCUMENTS

| | | | | |
|---|---|---|---|---|
| 2005/0168389 A1* | 8/2005 | Yuanzhu | H01Q 13/10 | 343/770 |
| 2010/0302112 A1* | 12/2010 | Lindenmeier | H01Q 21/24 | 343/730 |
| 2012/0218154 A1* | 8/2012 | White | H01Q 1/1271 | 29/600 |
| 2014/0152518 A1* | 6/2014 | Choudhury | H01Q 1/243 | 343/729 |
| 2017/0346154 A1* | 11/2017 | Kagaya | H01Q 13/106 | |
| 2019/0020115 A1* | 1/2019 | Reichardt | H04B 1/3822 | |
| 2021/0066808 A1* | 3/2021 | Tanaka | H01Q 1/3275 | |

FOREIGN PATENT DOCUMENTS

| | | |
|---|---|---|
| JP | 2005-244981 A | 9/2005 |
| JP | 2009-246795 A | 10/2009 |

* cited by examiner

*Primary Examiner* — Wei (Victor) Y Chan
(74) *Attorney, Agent, or Firm* — Oliff PLC

(57) ABSTRACT

A slot antenna includes: power-supply points; and a slot, wherein in the slot antenna, the power-supply points are arranged while interposing the slot therebetween in a shorter direction of the slot, the slot being an opening that is provided in a metal sheet constituting an outer panel of a vehicle, and a width along the shorter direction of the slot is larger in each of both end parts of the slot than in an intermediate part of the slot in a longitudinal direction of the slot.

18 Claims, 6 Drawing Sheets

SLOT ANTENNA

CROSS-REFERENCE TO RELATED APPLICATION

This application is based upon and claims the benefit of priority of the prior Japanese Patent Application No. 2022-026573, filed on Feb. 24, 2022, the entire contents of which are incorporated herein by reference.

FIELD

The embodiments discussed herein are directed to a slot antenna.

BACKGROUND

Conventionally, for example, in an antenna device provided in a vehicle, there has been proposed a technology that causes an opening of the vehicle body to function as a slot antenna (see Japanese Laid-open Patent Publication No. 2005-244981, for example).

However, in the conventional technology, for example, in a case where an opening is arranged in a roof of a vehicle or the like, an antenna length is limited by a body size of the vehicle, a needed reception frequency is not satisfied, and thus antenna performance is not always sufficient.

SUMMARY

In order to solve the above-mentioned problem, a slot antenna according to the present disclosure includes: power-supply points; and a slot, wherein in the slot antenna, the power-supply points are arranged while interposing the slot therebetween in a shorter direction of the slot, the slot being an opening that is provided in a metal sheet constituting an outer panel of a vehicle, and a width along the shorter direction of the slot is larger in each of both end parts of the slot than in an intermediate part of the slot in a longitudinal direction of the slot.

BRIEF DESCRIPTION OF DRAWING(S)

DESCRIPTION OF EMBODIMENTS

Hereinafter, embodiments of a slot antenna according to the present application will be described in detail with reference to the accompanying drawings. The present disclosure is not limited to the embodiments described in the following.

Figure 1:
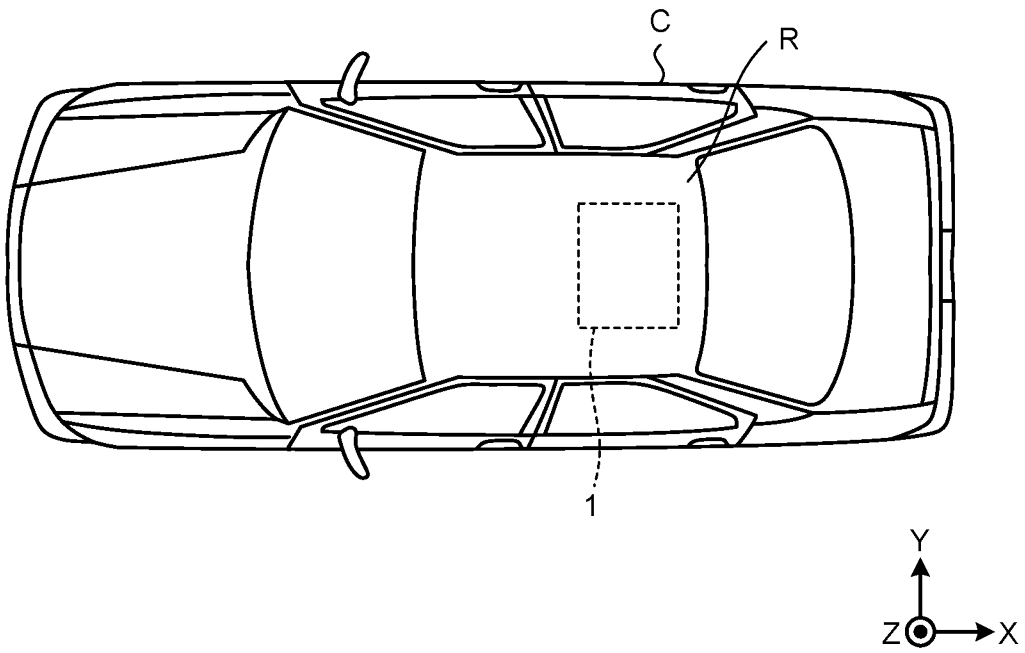
FIG. 1 is a diagram illustrating a mount position of a slot antenna according to an embodiment.

FIG. 1 is a diagram illustrating a mount position of a slot antenna according to the embodiment. As illustrated in FIG. 1, a slot antenna 1 according to the embodiment is mounted on a vehicle C. The slot antenna 1 is a slot antenna, for example, and is mounted on a roof R of the vehicle C.

A frequency band of electrical waves received by the slot antenna 1 is the VHF band (30 MHz to 300 MHz) and/or the UHF band (300 MHz to 3000 MHz), for example, and is a frequency band including broadcast waves of Frequency Modulation (FM) radio broadcast, Digital Audio Broadcast (DAB), Digital TeleVision (DTV), etc.

In the following drawings including FIG. 1, a three-axis orthogonal coordinate system is illustrated. Specifically, an X-axis corresponds to an advancing direction (front-back direction) of the vehicle C, a positive side thereof is prescribed as the rear, and a negative side thereof is prescribed as the front. A Y-axis corresponds to a vehicle-width direction of the vehicle C, a positive side thereof is prescribed as the right side of the vehicle, and a negative side thereof is prescribed as the left side of the vehicle. A Z-axis corresponds a height direction of the vehicle C, a positive side thereof is prescribed as the upward, and a negative side thereof is prescribed as the downward.

Figure 2:
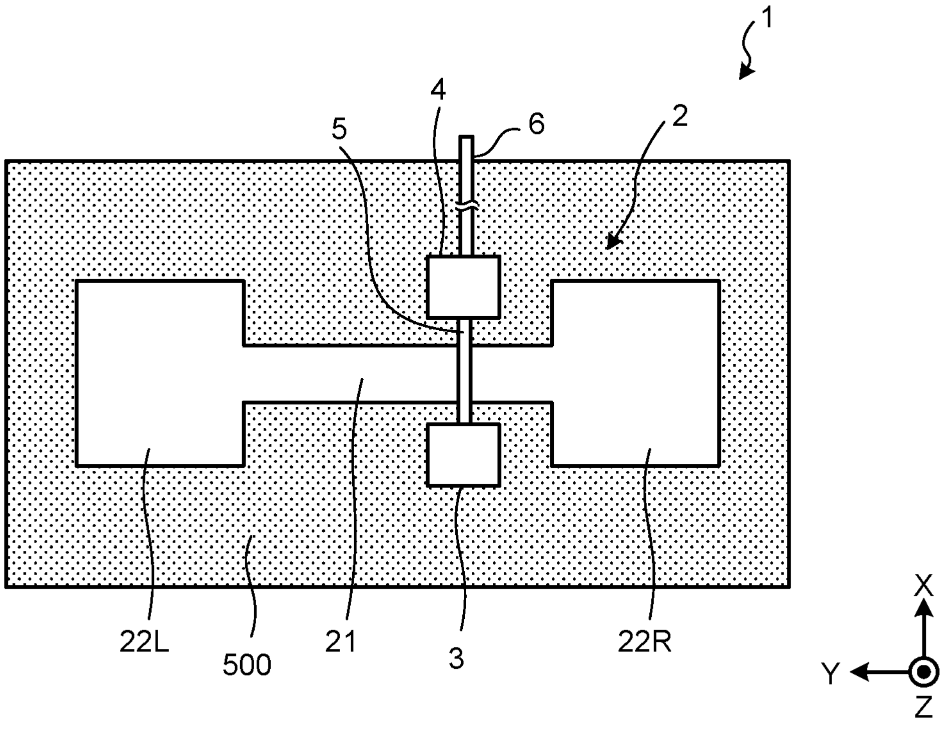
FIG. 2 is a perspective view illustrating a configuration example of the slot antenna according to the embodiment.

Next, with reference to FIG. 2, a configuration example of the slot antenna 1 according to the embodiment will be explained. FIG. 2 is a perspective view illustrating a configuration example of the slot antenna 1 according to the embodiment. As illustrated in FIG. 2, the slot antenna 1 according to the embodiment includes a slot part 2, a power supply unit 3, and a signal processor 4.

The slot part 2 is a slit-shaped opening arranged in a metal sheet 500 constituting an outer panel of the vehicle C. The slot part 2 functions as a slot that receives electrical waves from the outside by using the above-mentioned opening.

The power supply unit 3 power-supplies an electrical wave received by the slot part 2. The power supply unit 3 outputs the power-supplied electrical wave to the signal processor 4 via a power-supply line 5. Note that the power supply unit 3 is capacity-coupled to the slot part 2. For example, the power supply unit 3 is configured as a plate-shaped metal member, and forms a small gap between the plate-shaped metal member and the metal sheet 500 (for example, equal to or less than approximately 1 mm) so as to realize capacity coupling. Specifically, the plate-shaped metal member is bonded to the metal sheet 500 via a resin film made of polyethylene or polystyrol, or another insulation material so as to form a capacitor between the metal member and the metal sheet 500, and thus the capacity coupling is able to be realized.

In other words, the power supply unit 3 supplies power to the slot part 2 in a contactless manner. Thus, a configuration of the slot antenna 1 is able to be more simplified compared with a case where power is directly supplied to the slot part 2. The power supply unit 3 may employ direct power supply obtained by directly and electric conductively connecting an end of the power-supply line 5 to the metal sheet 500 so as to execute power supply.

The signal processor 4 converts an electrical wave acquired from the power supply unit 3 into an electrical signal. Specifically, the signal processor 4 converts a weak electrical wave acquired from the power supply unit 3 into an amplified electrical signal, and outputs the amplified electrical signal to a reproducing device (radio, television, and the like) via a coaxial cable 6.

The power supply unit 3 and the signal processor 4 are constituted as power-supply points. In other words, power-supply points are arranged while interposing the slot part 2 therebetween in a lateral direction of the slot part 2.

Incidentally, if an opening (slot part) for receiving an electrical wave in the FM band is formed in a rectangular shape, an antenna length of approximately 2 m is necessary; however, it is difficult to satisfy the above-mentioned antenna length by a length in a vehicle-width direction (Y-axis direction) of a common vehicle. Note that in arranging an opening in a metal sheet, in consideration of bypassing a body component such as a reinforce, which is important in the body rigidity, a rectangular-shaped opening that is long in a vehicle-width direction (Y-axis direction) is necessarily arranged.

Therefore, if an opening is shortened in accordance with a length of a vehicle width, reception of an electrical wave in a desired frequency band becomes difficult, and thus there presents a room for improvement in antenna performance.

Thus, in the slot antenna 1 according to the embodiment, regarding a shape of an opening that is the slot part 2, both of end parts 22L and 22R in a vehicle-width direction are formed to be thicker than that of a center part 21 so as to improve antenna performance.

Specifically, in an opening of the slot part 2, lengths in a lateral direction (X-axis direction) of both of the end parts 22L and 22R arranged in a longitudinal direction (Y-axis direction) are longer than that of the center part 21. In other words, in the slot part 2, widths of both end parts arranged in a longitudinal direction are wider than that of a center part. In other words, the slot part 2 is formed as an opening having a substantially dumbbell shape in a top view. Note that the longer are lengths in a lateral direction of both of the end parts 22L and 22R, the wider (wide band) is a receivable frequency band.

Thus, a length of the slot part 2 in a longitudinal direction (Y-axis direction) is able to be shorter than a case of a rectangular-shaped opening, so that it is possible to receive an electrical wave in the FM band while keeping the slot part 2 within a length of the roof R in a vehicle-width direction. In other words, with the slot antenna 1 according to the embodiment, it is possible to improve antenna performance.

As illustrated in FIG. 2, the power supply unit 3 (and signal processor 4) is arranged to be displaced from the center in a longitudinal direction (Y-axis direction) of an opening that is the slot part 2. In the example illustrated in FIG. 2, an example is indicated in which the power supply unit 3 (and signal processor 4) is arranged to be displaced from the center of the slot part 2 on the right side (close to end part 22R).

As described above, the power supply unit 3 is arranged to be displaced from the center of the slot part 2, so that it is possible to realize a wide band of a received electrical wave.

The power supply unit 3 may be displaced from the center of the slot part 2 on the left side (close to end part 22L). A displacement position (displacement amount from center) is decided on the basis of an area of an opening that is the slot part 2, sizes of both of the end parts 22R and 22L and the center part 21 (thickness and length), and a reception frequency.

Note that in FIG. 2, an example is exemplified in which a shape of an opening is formed in dumbbell-shaped so as to form the slot part 2; for example, an electric conductive plate 100 may be additionally provided to a rectangular-shaped opening so as to form the dumbbell-shaped slot part 2. This point will be explained with reference to FIGS. 3 to 5.

Figure 3:
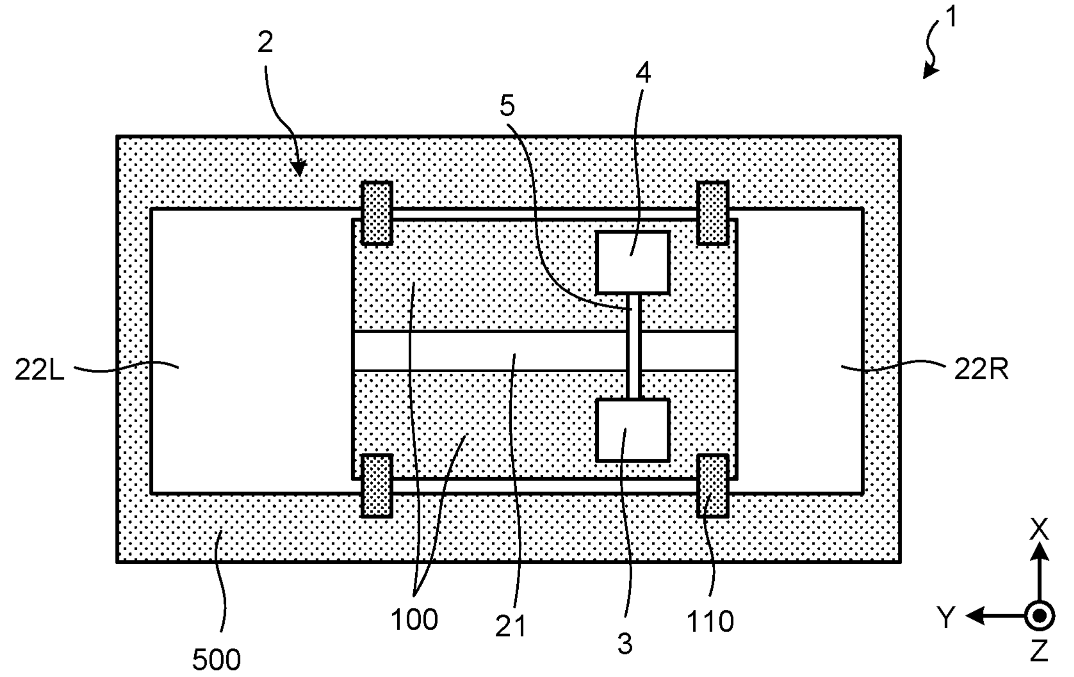
FIG. 3 is a diagram illustrating another configuration example of the slot antenna.
Figure 4:
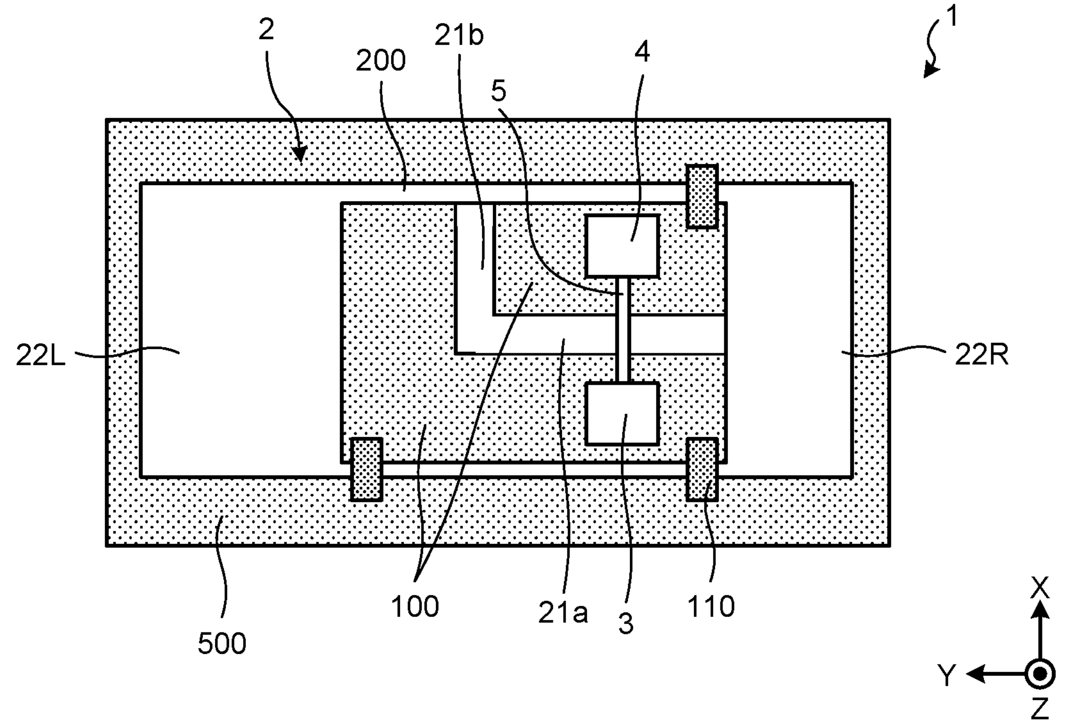
FIG. 4 is a diagram illustrating another configuration example of the slot antenna.
Figure 5:
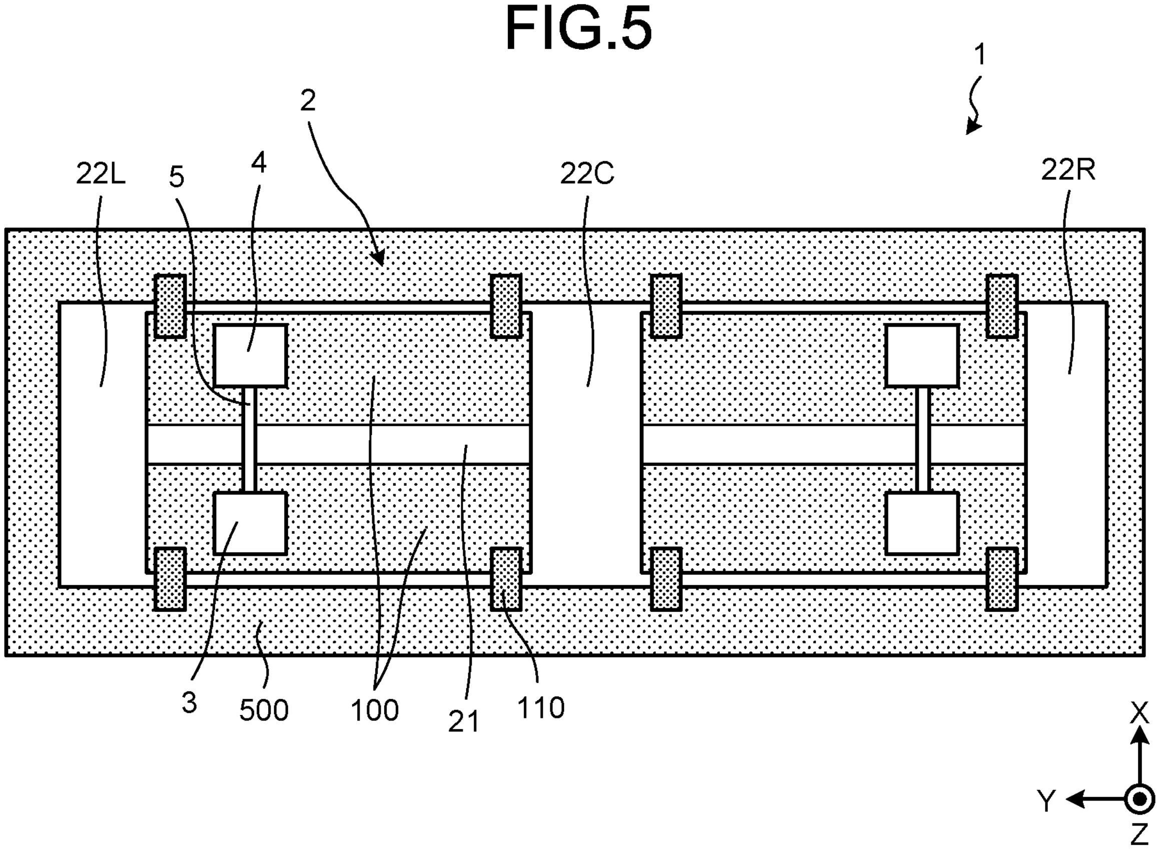
FIG. 5 is a diagram illustrating another configuration example of the slot antenna.

FIGS. 3 to 5 are diagrams illustrating other configuration examples of the slot antennae. As illustrated in FIG. 3, in the slot antenna 1, the electric conductive plate 100 is arranged in a rectangular-shaped opening so as to form the slot part 2. For one example, the electric conductive plate 100 is an electric conductive pattern laminated on a substrate 120 (see FIG. 8) that is made of an insulation material such as glass epoxy and ceramic, and is able to be configured by using a structure of a general printed wiring board. Specifically, the electric conductive plate 100 is arranged in an opening such that the electric conductive plate 100 is flush with the metal sheet 500 that is an outer panel of a vehicle, and is electrically connected to the metal sheet 500.

In other words, the electric conductive plate 100 is arranged to be flush with an outer panel such that the electric conductive plate 100 divides a region inside of an opening of the outer panel in a planar view into both end parts in a longitudinal direction, and is electrically connected to the metal sheet 500. The electrical connection between the metal sheet 500 and the electric conductive plate 100 is performed by fixing the metal sheet 500 and the electric conductive plate 100 to each other by using a metallic bracket 110, for example. Note that the above mentioned wording of "flush" includes not only completely flush surfaces, but also surfaces having therebetween an error up to several centimeters (for example, five centimeters), and it is sufficient that whole of the surfaces constitutes a part of an outer panel of the vehicle C.

More specifically, the two electric conductive plates 100 are arranged in the center of a rectangular-shaped opening in a longitudinal direction (Y-axis direction) while forming a slit to be the center part 21 therebetween in a lateral direction (X-axis direction) so as to form the slot part 2. In other words, the two electric conductive plates 100 are arranged so as not to be electrically connected to each other by a slit to be the center part 21.

In other words, both of the end parts 22R and 22L of the slot part 2 are arranged on both sides in a longitudinal direction of the electric conductive plate 100, and further are connected to each other via the center part 21 that is a slit between the two electric conductive plates 100. In other words, the electric conductive plates 100 include a slit for connecting both end parts of an opening, and the slot part 2 is formed by both end parts and a slit connecting both of the end parts.

A shape of the slit arranged between the electric conductive plates 100 is not limited to a straight line, and an arbitrary shape, such as a meander (winding) shape and a wave shape, may be employed as long as the electric conductive plates 100 are separately arranged in respective two regions while interposing a slit therebetween. Thus, it is possible to increase a slot length with respect to a length of an opening in a metal sheet, so that an electrical wave in a lower frequency band is able to be effectively received.

As described above, the electric conductive plates 100 are arranged in a rectangular-shaped opening so as to form the slot part 2, and thus a shape of an opening provided in a metal sheet of a vehicle is able to be a simple one such as a rectangular shape, so that it is possible to simplify processing of the metal sheet. The electric conductive plate 100 in which a slit is preliminarily formed is attached to an opening of a metal sheet to constitute a slot antenna, so that it is possible to easily embed the antenna in assemblage of a vehicle.

In the example illustrated in FIG. 3, the electric conductive plates 100 are arranged to be displaced on the right side (side of end part 22R) from the center of a rectangular-shaped opening in a longitudinal direction (Y-axis direction). In other words, the electric conductive plates 100 are displaced such that an area of the end part 22L is larger than an area of the end part 22R. In other words, the electric conductive plates 100 are arranged in an opening such that lengths in a longitudinal direction of the opening of regions on both sides in the longitudinal direction, which are separately formed by the electric conductive plates 100, are different from each other. Thus, it is possible to achieve effects similar to effects by a case where a power-supply point is displaced from the center of a slot in a longitudinal direction thereof.

Furthermore, the power supply unit 3 and the signal processor 4 that are power-supply points may be arranged to be displaced from the center of the electric conductive plates 100 in a longitudinal direction (Y-axis direction). In the example illustrated in FIG. 3, the power supply unit 3 is arranged to be displaced on the right side from the center of the electric conductive plate 100 in a longitudinal direction (Y-axis direction).

As described above, the electric conductive plate 100 and the power supply unit 3 are individually displaced, so that it is possible to realize a wide band of electrical waves. Moreover, the electric conductive plates 100 are displaced, and thus the slot antenna 1 is able to be easily attached to various-type vehicles of which sizes of the roofs R are different without changing a position of the power supply unit 3.

In FIG. 3, a shape of a slit to be the center part 21 is a straight line extending in a longitudinal direction (Y-axis direction) of the slot part 2; however, an arbitrary shape may be employed for a shape of the slit as illustrated in FIG. 4, for example, as long as the two electric conductive plates 100 are not electrically connected to each other.

Specifically, as illustrated in FIG. 4, the two electric conductive plates 100 form a slit to be the center part 21, and are arranged in a state where a gap 200 is formed between the two electric conductive plates 100 and the metal sheet 500. In other words, the gap 200 is a gap that is formed in a lateral direction (X-axis direction) of an opening. In other words, the electric conductive plate 100 is arranged so as to connect both end parts while forming the gap 200 from a periphery (X-axis positive side) of the opening.

A slit to be the center part 21 includes a longitudinal slit part 21*a* extending in a longitudinal direction (Y-axis direction) of the opening and one end of which is connected with one of the end parts 22R and 22L in the opening. In FIG. 4, one end of the longitudinal slit part 21*a* on a side of the end part 22R is connected with the end part 22R.

A slit to be the center part 21 includes a lateral slit part 21*b* extending in a lateral direction of the opening and connected with the other end of the longitudinal slit part 21*a* on a side of the end part 22L and the gap 200. In other words, the center part 21 is formed in L-shaped by the longitudinal slit part 21*a* and the lateral slit part 21*b*.

In other words, the electric conductive plate 100 is arranged while forming the gap 200 that is connected with one of both end parts from a periphery of an opening, and further includes a slit (longitudinal slit part 21*a* and lateral slit part 21*b*) that connects the other of both of the end parts and the gap 200 with each other. The slot part 2 is constituted of a slit (longitudinal slit part 21*a* and lateral slit part 21*b*) that connects one of both of the end parts and the gap 200 with each other and further connects the other of both of the end parts and the gap 200 with each other.

A side of the end part 22L of the gap 200 is not electrically connected by the bracket 110. In other words, the slot part 2 is configured as a continuous opening that is formed by the longitudinal slit part 21*a*, the lateral slit part 21*b*, and both of the end parts 22R and 22L. A side of the end part 22L of the gap 200 may be connected with the metal sheet 500 by using the bracket 110 via an insulation material, or may be connected with the metal sheet 500 by using an insulation bracket. A side of the end part 22L of the gap 200 is also connected with a metal sheet, and thus the electric conductive plate 100 is able to be attached to a vehicle body more stiffly.

Thus, it is possible to increase a slot length with respect to a length of an opening in a metal sheet, so that an electrical wave in a lower frequency band is able to be effectively received. A shape of the slit provided in the electric conductive plate 100 is not limited to the above-mentioned L-shape, and an arbitrary shape, such as a meander (winding) shape and a wave shape, may be employed as long as the electric conductive plates 100 are separately arranged in respective two regions while interposing a slit therebetween.

As illustrated in FIG. 5, a plurality of sets of the electric conductive plates 100 and the power supply units 3 (signal processors 4) may be provided in the slot antenna 1. Specifically, as illustrated in FIG. 5, two sets each of which includes the two electric conductive plates 100, the power supply unit 3, and the signal processor 4 are arranged in the slot antenna 1 in a longitudinal direction (Y-axis direction) of an opening. In other words, each set constituted of the two electric conductive plates 100 in an up-and-down direction (X-axis direction) is arranged in a state where the two sets are separated in a longitudinal direction (Y-axis direction) of an opening.

In other words, the slot antenna 1 includes a left-side slot antenna whose both ends are the end part 22L (left edge) and an end part 22C (right edge), and a right-side slot antenna whose both ends are the end part 22C (left edge) and the end part 22R (right edge).

In other words, two slot antennae are symmetrically arranged in the left and right of a single opening so as to perform power supply by two supply lines. Thus, it is possible to realize antenna diversity.

In the slot antenna 1, a planar antenna 300 may be arranged in an opening to be the slot part 2. This point will be explained with reference to FIGS. 6 to 8.

Figure 6:
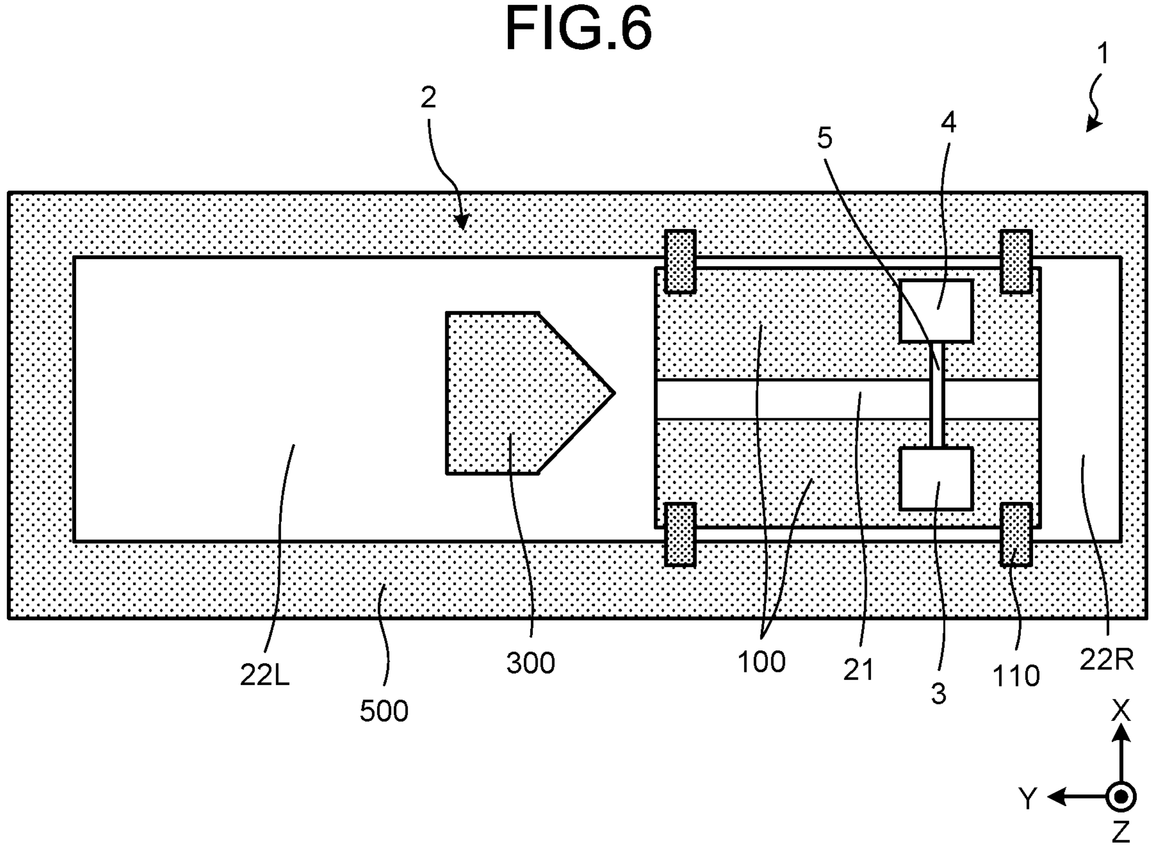
FIG. 6 is a diagram illustrating an arrangement example of a planar antenna.
Figure 7:
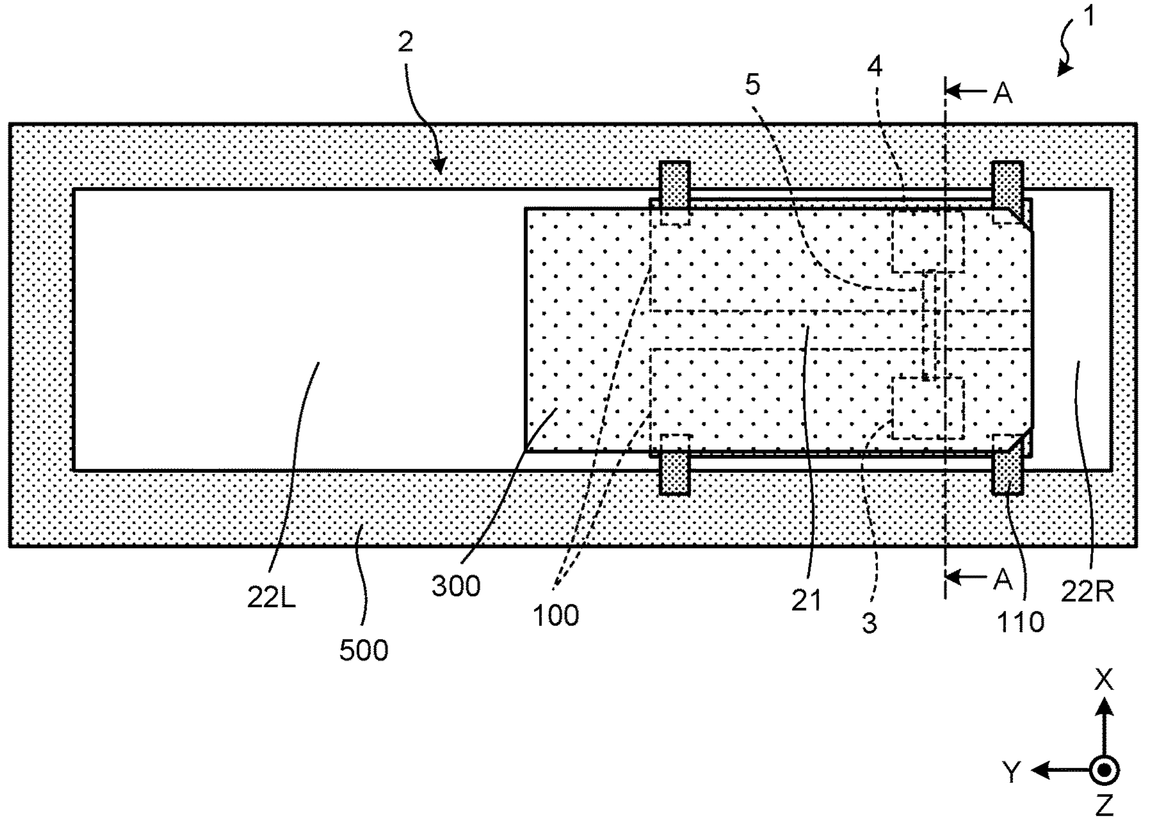
FIG. 7 is a diagram illustrating an arrangement example of the planar antenna.
Figure 8:
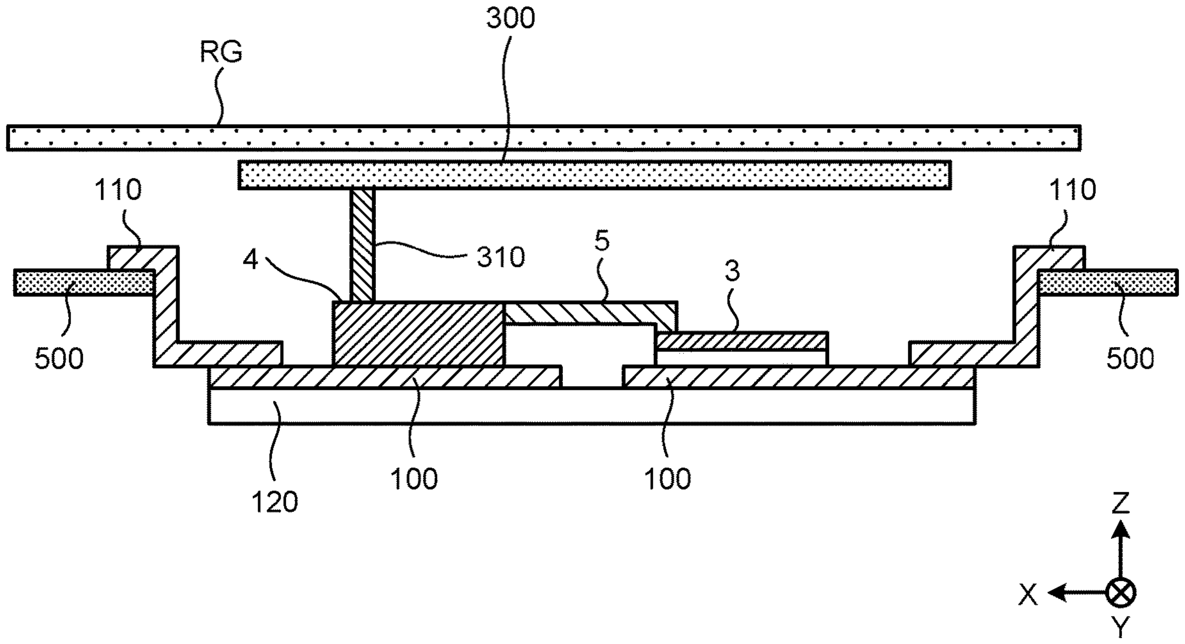
FIG. 8 is a diagram illustrating an arrangement example of the planar antenna.

FIGS. 6 to 8 are diagrams illustrating arrangement examples of the planar antenna 300. FIG. 8 indicates a cross section taken along a line A-A illustrated in FIG. 7.

As illustrated in FIG. 6, the planar antenna 300 is arranged in an opening such that the planar antenna 300 is flush with the metal sheet 500 to be an outer panel, along with the electric conductive plate 100, in one of the end parts 22R and 22L in the slot part 2.

In the example illustrated in FIG. 6, the planar antenna 300 is arranged in the end part 22L. In other words, one of the two sets each includes the two electric conductive plates 100, the power supply unit 3, and the signal processor 4 that are illustrated in FIG. 5 is replaced with the planar antenna 300.

The planar antenna 300 is a monopole planar antenna that is optimized for a frequency band (FM band, DAB band, and DTV band), which is capable of executing reception by using the slot part 2 on a side of the electric conductive plate 100. Thus, it is possible to realize antenna diversity of a band optimized by the electric conductive plate 100 and the planar antenna 300.

As illustrated in FIGS. 7 and 8, in a case of the planar antenna 300 configured to receive the AM band, the above-mentioned planar antenna 300 may be arranged such that a part of the planar antenna 300 is overlapped with the electric conductive plate 100. Specifically, as illustrated in FIGS. 7 and 8, the planar antenna 300 is arranged such that at least a part of the planar antenna 300 is overlapped with the electric conductive plate 100 in the top view in a state where the electric conductive plate 100 is arranged in an inner part (Z-axis negative side) of the vehicle C.

Specifically, as illustrated in FIG. 8, the planar antenna 300 is arranged in an opening such that the planar antenna 300 is flush with the metal sheet 500. One surface of the electric conductive plate 100 is laminated on the substrate 120, and further is fixed to an outer surface of the metal sheet 500 of a vehicle (Z-axis positive side) in a state where the other surface of the electric conductive plate 100 is integrated with (fixed to) the bracket 110.

The bracket 110 has a shape extending to an inner part of a vehicle from the metal sheet 500 and bending to the inside (inside of opening). In other words, the electric conductive plates 100 form a slit to be the center part 21 by using end parts reverse to the brackets 110.

In other words, the center part 21 of the slot part 2 is arranged inside of a vehicle from the metal sheet 500, and both of the end parts 22R and 22L are arranged to be flush with the metal sheet 500 and the planar antenna 300. In other words, the center part 21 of the slot part 2 and both of the end parts 22R and 22L are displaced in the Z-axis direction.

Even in a case where the center part 21 and both of the end parts 22R and 22L are displaced in the Z-axis direction, antenna performance of the slot part 2 does not deteriorate.

If a distance (Z-axis direction) between the planar antenna 300 and the electric conductive plate 100 is set to equal to or more than approximately 5 mm, for example, it is possible to avoid adverse effects due to the planar antenna 300 on antenna performance of the electric conductive plate 100.

The planar antenna 300 and the signal processor 4 are connected to each other by a power-supply line 310 to be able to perform power supply. Thus, it is possible to arrange the planar antenna 300 that is a reception antenna of the AM band without deteriorating antenna performance by the electric conductive plate 100.

A roof garnish RG is arranged above (Z-axis positive side) the planar antenna 300 and the metal sheet 500, and thus the slot antenna 1 including the planar antenna 300 is able to be hidden, so that it is possible to prevent loss of designability in exterior of a vehicle.

As described above, the slot antenna 1 according to the embodiment in which power-supply points (power supply unit 3 and signal processor 4) are arranged while interposing a slot (slot part 2) therebetween in a lateral direction of the slot, the slot being a slit-shaped opening that is provided in the metal sheet 500 constituting an outer panel of a vehicle, wherein a width of each of end parts of the slot in a longitudinal direction of the slot is larger than a width of the slot. Thus, it is possible to improve antenna performance.

Note that in FIG. 2, an example is illustrated in which an opening to be the slot part 2 has a dumbbell shape; however, an arbitrary shape may be employed as long as both of the end parts 22R and 22L in an opening are thicker than the center part 21.

Figure 9:
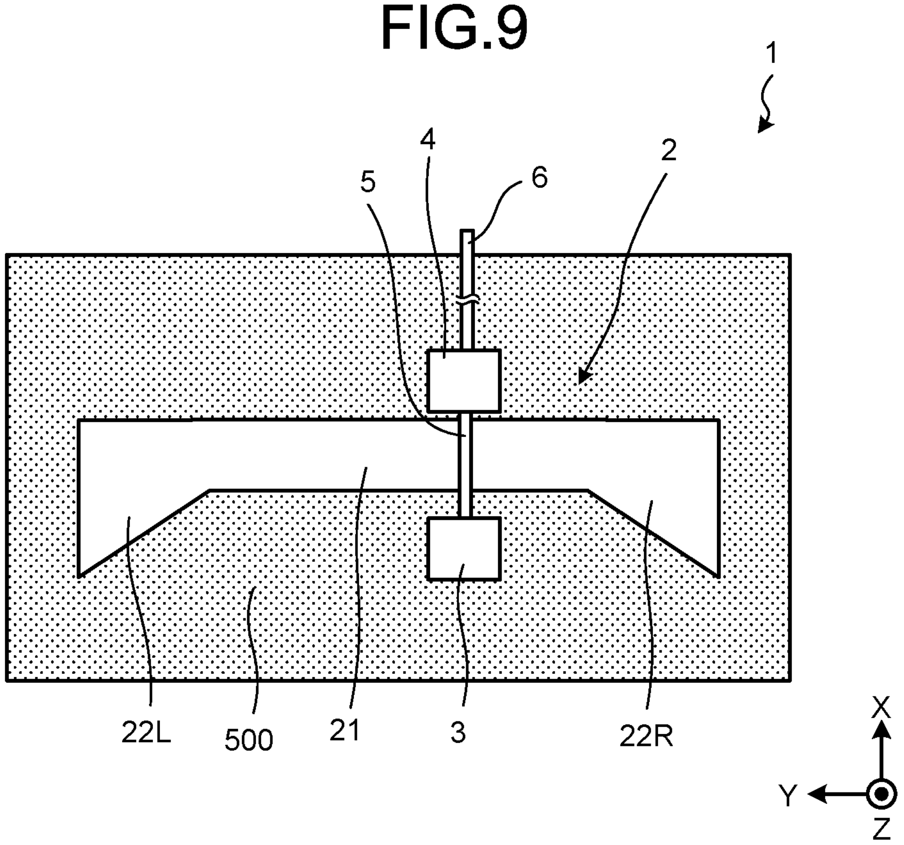
FIG. 9 is a diagram illustrating another shape of an opening of a slot part.

FIG. 9 is a diagram illustrating another shape of an opening of the slot part 2. As illustrated in FIG. 9, each of the end parts 22R and 22L may be tapered in which the corresponding one is tapering toward the center part 21. In other words, each of the end parts 22R and 22L has a shape in which a length thereof in a lateral direction (X-axis direction) gradually decreases toward the center part 21.

According to such a shape, an antenna length of the slot antenna 1 is able to be set within a vehicle width, so that it is possible to improve antenna performance.

In FIGS. 2 and 9, cases are exemplified in which both of the end parts 22R and 22L of the slot part 2 have the same shape; however, shapes of both of the end parts 22R and 22L may be different from each other. In other words, lengths in a lateral direction and/or lengths in longitudinal direction of the end part 22R and the end part 22L may be different from each other.

Figure 10:
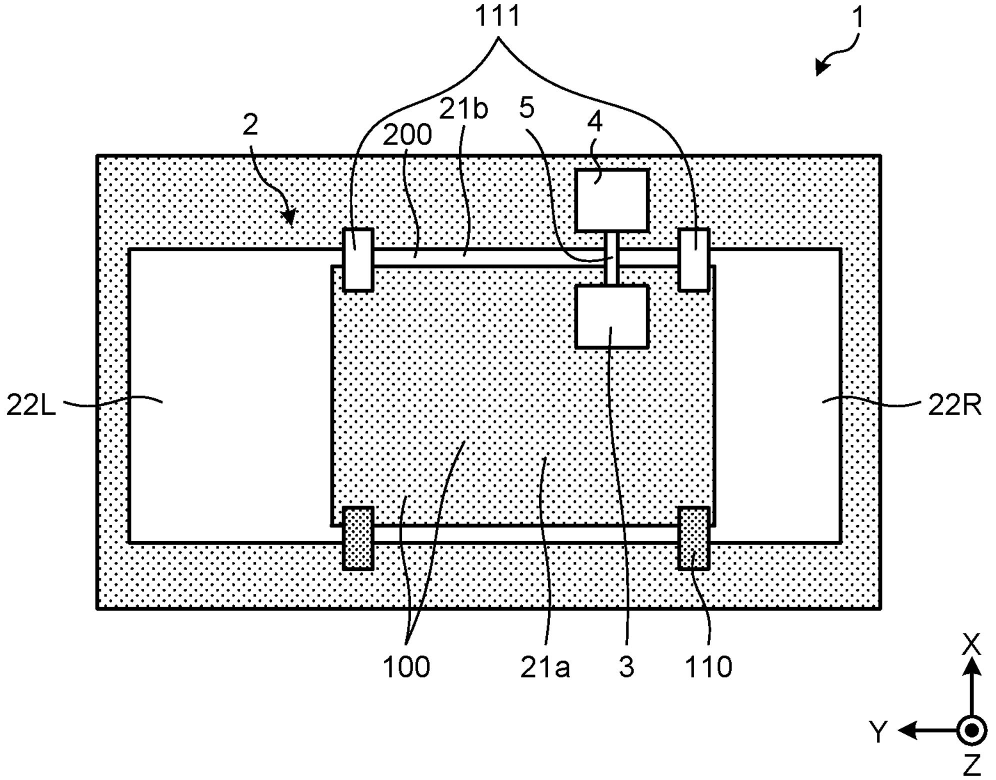
FIG. 10 is a diagram illustrating another configuration example of the slot antenna.
Figure 11:
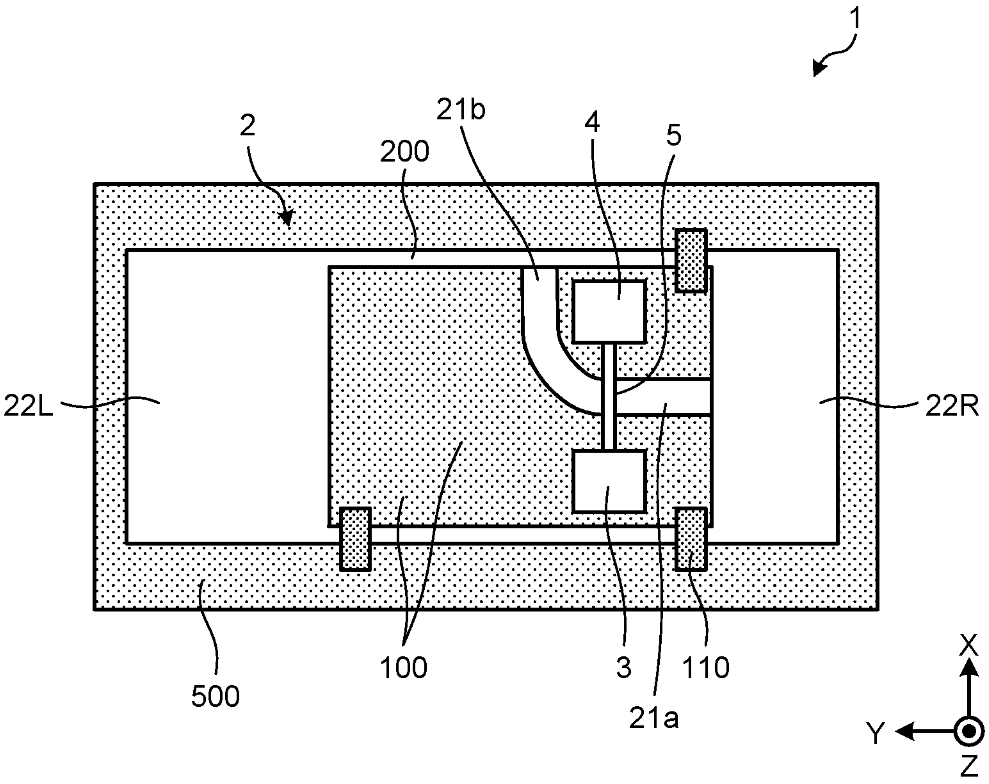
FIG. 11 is a diagram illustrating another configuration example of the slot antenna.

Next, with reference to FIGS. 10 and 11, other configuration examples of the slot antenna 1 will be explained. FIGS. 10 and 11 are diagrams illustrating other configuration examples of the slot antenna 1. As illustrated in FIG. 10, for example, the slot antenna 1 may be configured such that the gap 200 between the electric conductive plate 100 and the metal sheet 500 is used as the center part 21.

In this case, the electric conductive plate 100 and the metal sheet 500 are connected by insulation brackets 111 on a side on which the gap 200 is formed (in FIG. 10, upper part in X-axis direction), and an opposite side (in FIG. 10, lower part in X-axis direction) is electric conductively connected by using the metallic brackets 110. In other words, the slot part 2 is formed as a continuous opening constituted of the gap 200 and both of the end parts 22R and 22L. Note that a side on which the gap 200 is formed may be connected with the metallic bracket 110 via an insulation material instead of the insulation bracket 111.

In other words, the electric conductive plate 100 is arranged such that the gap 200 is formed from a periphery of an opening to connect both end parts, and the slot part 2 is constituted of both of the end parts and the gap 200.

As illustrated in FIG. 11, in the slot antenna 1, the longitudinal slit part 21*a* and the lateral slit part 21*b* constituting the center part 21 may be connected by a curved line. In other words, the electric conductive plate 100 is arranged to form the gap 200 connected to one of both end parts from a periphery of an opening, and includes a slit that connects the other of both of the end parts and the gap 200. The slot part 2 is constituted of a slit that connects one of both of the end parts and the gap 200, and connects the other of both of the end parts and the gap 200.

According to the present disclosure, it is possible to improve antenna performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A slot antenna comprising:

power-supply points; and a slot, wherein in the slot antenna, the power-supply points are arranged while interposing the slot therebetween in a shorter direction of the slot, the slot being an opening that is provided in a metal sheet constituting an outer panel of a vehicle, and a width along the shorter direction of the slot is larger in each of both end parts of the slot than in an intermediate part of the slot in a longitudinal direction of the slot.

2. The slot antenna according to claim 1, wherein the power-supply points are displaced from a center of the slot in the longitudinal direction.

3. The slot antenna according to claim 1, wherein the power-supply point is capacity-coupled to the slot.

4. The slot antenna according to claim 1 further comprising:

an electric conductive plate that is arranged to be flush with the outer panel such that the electric conductive plate divides a region inside of the opening of the outer panel in a planar view into both end parts in a longitudinal direction of the region, and is electrically connected to the metal sheet, wherein the electric conductive plate includes a slit that connects both end parts of the opening, and the slot is constituted of both of the end parts and the slit that connects both of the end parts.

5. The slot antenna according to claim 1 further comprising:

an electric conductive plate that is arranged to be flush with the outer panel such that the electric conductive plate divides a region inside of the opening of the outer panel in a planar view into both end parts in a longitudinal direction of the region, and is electrically connected to the metal sheet, wherein the electric conductive plate is arranged to form a gap between the electric conductive plate and a periphery of the opening to connect both of the end parts, and the slot is constituted of both of the end parts and the gap.

6. The slot antenna according to claim 1 further comprising:

an electric conductive plate that is arranged to be flush with the outer panel such that the electric conductive plate divides a region inside of the opening of the outer panel in a planar view into both end parts in a longitudinal direction of the region, and is electrically connected to the metal sheet, wherein the electric conductive plate is arranged to form a gap connected with one of both of the end parts from a periphery of the opening, and includes a slit that connects another of both of the end parts and the gap, and the slot is constituted of both of the end parts, the gap, and the slit.

7. The slot antenna according to claim 4, wherein the electric conductive plate is arranged in the opening such that lengths of both of the end parts along a longitudinal direction of the opening are different from each other.

8. The slot antenna according to claim 4, wherein the power-supply point is arranged to be displaced from a center in a longitudinal direction of the slit of the electric conductive plate.

9. The slot antenna according to claim 4, wherein a plurality of electric conductive plates each including the slit is separately arranged in a longitudinal direction of the opening.

10. The slot antenna according to claim 4 further includes:

a planar antenna that is arranged in the opening such that the planar antenna is flush with the outer panel along with the electric conductive plate.

11. The slot antenna according to claim 10, wherein the planar antenna is such that at least a part of the planar antenna is overlapped with the electric conductive plate in the top view in a state where the electric conductive plate is arranged in an inner part of the vehicle.

12. The slot antenna according to claim 1, wherein the opening is provided in a metal sheet constituting a roof of the vehicle.

13. The slot antenna according to claim 12, wherein the longitudinal direction of the slot is arranged along a width direction of the vehicle.

14. The slot antenna according to claim 13, wherein the slot antenna receives an electric wave within a band of Frequency Modulation (FM) radio broadcasting.

15. A slot antenna comprising:

power-supply points; and a slot, wherein in the slot antenna, the power-supply points are arranged while interposing the slot therebetween in a shorter direction of the slot, and the slot is a dumbbell-shaped opening that is provided in the metal sheet constituting the outer panel of the vehicle.

16. The slot antenna according to claim 15, wherein the slot is an opening that is provided in a metal sheet constituting a roof of the vehicle.

17. The slot antenna according to claim 16, wherein the longitudinal direction of the slot is arranged along a width direction of the vehicle.

18. The slot antenna according to claim 17, wherein the slot antenna receives an electric wave within a band of FM radio broadcasting.

* * * * *